April 1, 1952

M. A. PICCIANO 2,591,195

THERMAL FLOWMETER

Filed March 1, 1946

INVENTOR.
Michael A. Picciano

BY Cousins & Cousins
ATTORNEYS.

April 1, 1952 — M. A. PICCIANO — 2,591,195
THERMAL FLOWMETER

Filed March 1, 1946 — 3 Sheets-Sheet 2

INVENTOR.
Michael H. Picciano
BY
ATTORNEYS.

April 1, 1952 — M. A. PICCIANO — 2,591,195
THERMAL FLOWMETER
Filed March 1, 1946 — 3 Sheets-Sheet 3
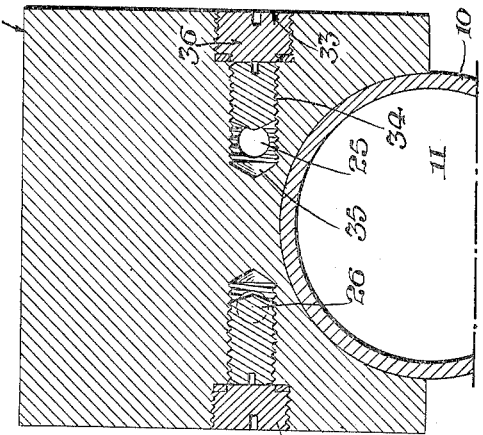
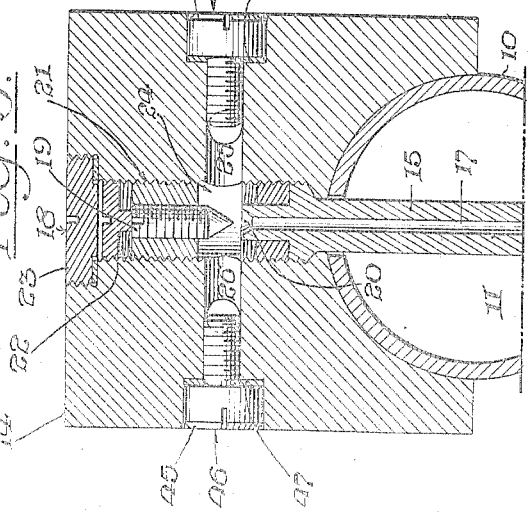
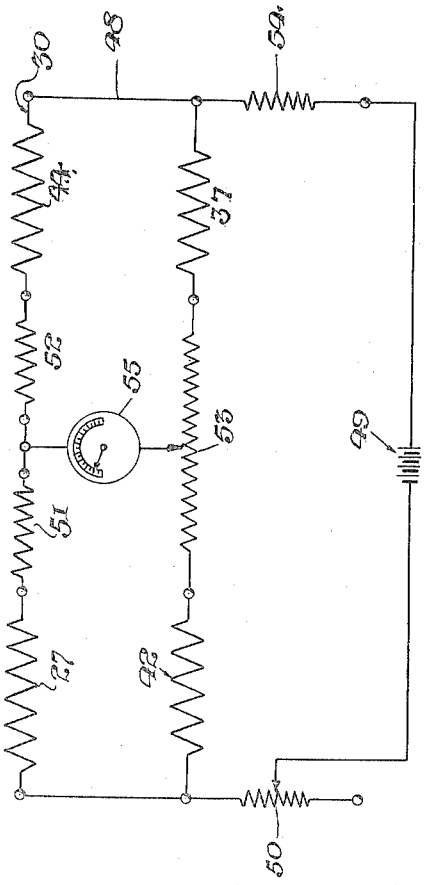
INVENTOR.
Michael A. Picciano
BY Cousins & Cousins
ATTORNEYS.

Patented Apr. 1, 1952

2,591,195

UNITED STATES PATENT OFFICE 2,591,195

THERMAL FLOWMETER

Michael A. Picciano, Maywood, N. J., assignor to Breeze Corporations, Inc., Newark, N. J., a corporation of New Jersey Application March 1, 1946, Serial No. 651,342

3 Claims. (Cl. 73—204)

This invention relates to flowmeters, particularly such as are adapted for measuring the rate of flow of either liquids or gases supplied through conduits to operate aircraft or other engines.

An object of this invention is to provide an accurate flowmeter which will function without moving parts.

Another object of this invention is to provide a sensitive flowmeter having a minimum of parts.

A feature of this invention is its construction which enables it to be cleaned without being removed from the line.

A further feature of this flowmeter is that it can easily be calibrated to adapt it to any conditions under which it is to operate.

Another object of this invention is to eliminate forward and rearward pressure pulses which interfere with the satisfactory operation of many known flowmeters.

A feature of this invention is an internal construction which prevents the formation of vapor traps in the system of the flowmeter.

A final object of this invention is to provide a flowmeter which may be permanently inserted in a fluid line when it is desired that the rate of flow be known.

This invention consists of the construction, combination and arrangement of parts described and claimed.

In the accompanying drawings, forming part hereof, is illustrated one form of embodiment of the invention, in which drawings similar reference characters designate corresponding parts, and in which:

Figure 3 is a cross sectional view taken on line 3—3 of Figure 1.

Figure 4 is a section taken on line 4—4 of Figure 1.

Figure 5 is a section taken on line 5—5 of Figure 1, and

Figure 6 is a wiring diagram for the flowmeter.

The component parts of this invention cooperate to lead a certain amount of the fluid or gas passing through the line through a series of four electrically heated cells. Said cells are brought to a uniform temperature but variations in the velocity of flow past them result in unequal cooling of the cells through the process of forced convection. This cooling modifies the resistance of the high temperature-coefficient resistor element located in each of the heated cells. In the preferred form of the invention this variation in resistance is measured by incorporating said resistors in a Wheatstone bridge and is a direct function of the rate of flow of the gas or liquid. It is possible however, to provide means whereby the amount of current passing through each electrically heated cell may be measured separately and the flowmeter regulated accordingly.

Figure 2:
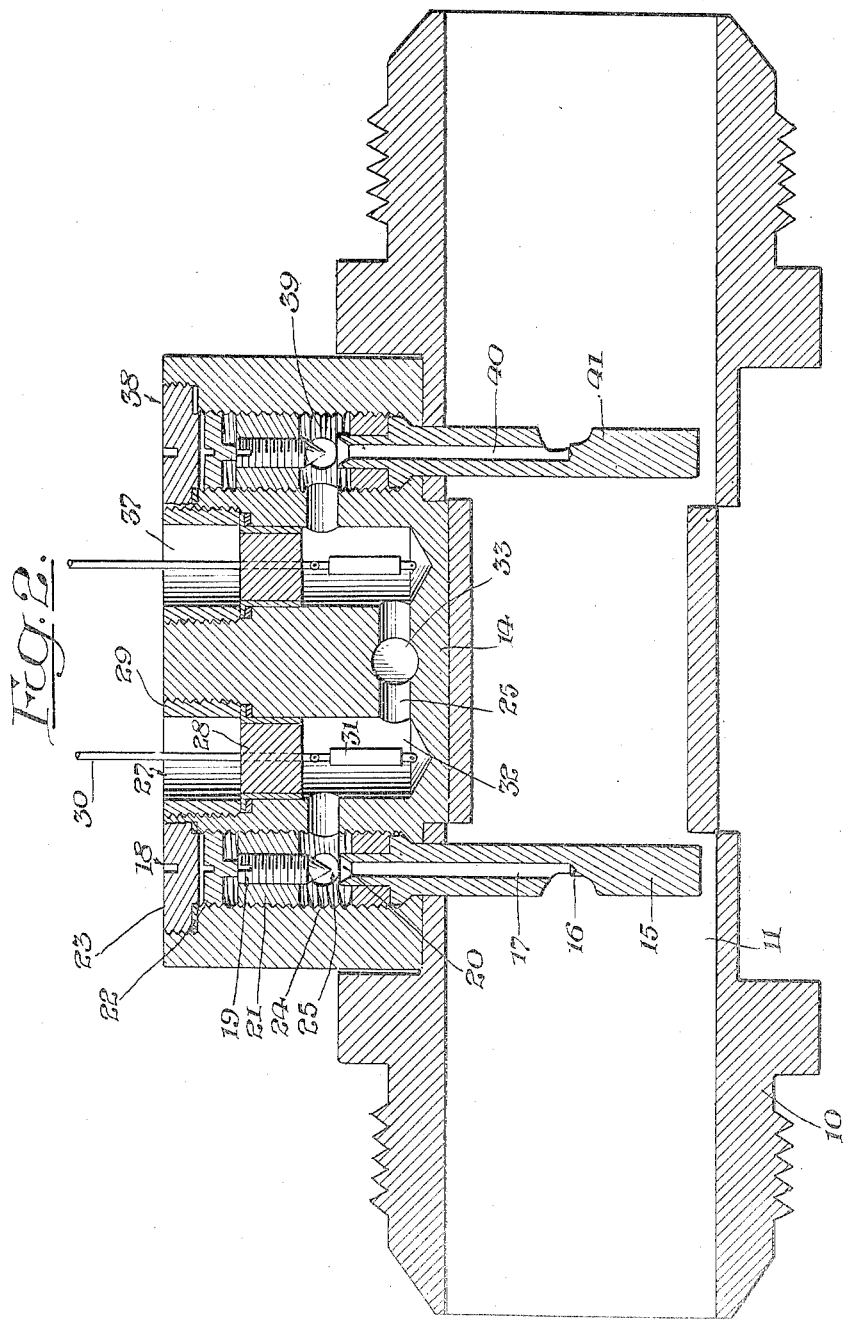
Figure 2 is a section of the flowmeter taken on line 2—2 of Figure 1.

Referring to the drawings, and particularly to Figure 2, 10 indicates a tube having threaded and hexagonal ends. It is bored (11) to a maximum diameter equal to that of the inside diameter of the line into which it is inserted. A preferred construction provides for a bore 11 smaller than that of the line but not to exceed the permissible restrictive pressure drop in the line. The reduced bore 11 prevents the formation of vapor traps within the system of the flowmeter.

A valve block 14 is attached to the cylindrical tube 10 and comprises the second major feature of the flowmeter. Said block 14 is machined to accommodate a plurality of valves, hereinafter described, and also to direct the flow of a portion of the fluid or gas through the device.

In Figure 2 the fluid enters the flowmeter from the left under the line pressure, proceeds past two by-pass nipples 15, 41 and out the other end of the bore 11. A portion of the fluid, however, enters an opening 16 in the by-pass nipple 15, flows through the nipple bore 17 and enters a metering needle valve 18.

Said valve 18 comprises an adjustable needle 19, a valve seat 20 formed in the upper end of the by-pass nipple 15, a needle bushing 21 to hold the adjusted needle 19, a needle lock plug 22 and a cover plate and gasket 23, sealing the valve.

The fluid enters the valve chamber 24 by way of the by-pass nipple bore 17 and leaves by means of the two flow path openings 25, 26 in the said chamber 24. The location of the flow path openings 25, 26 is clearly shown in Figure 3.

Figure 1:
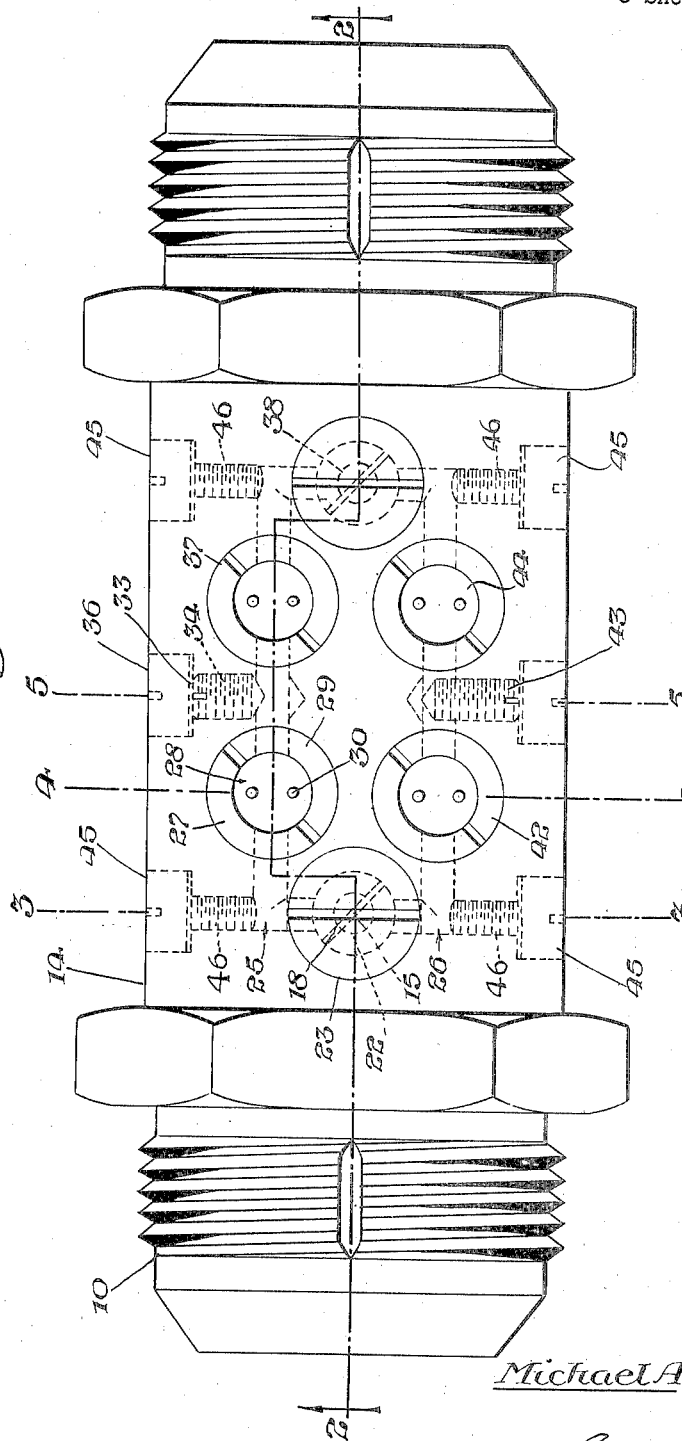
Figure 1 is a plan view of the flowmeter with certain of the internal parts shown in dotted lines.

In Figure 1 the two courses followed by the fluid through the flow paths 25, 26 bored in the valve block 14 are shown by dotted lines. Tracing the fluid in path 25 it is apparent that it is carried past a right angle turn and into a thermal cell unit 27.

A clear illustration of the structure of the thermal cell unit may be found by referring to Figure 4. This cross section shows two thermal cells 27, 42 of identical construction consisting of a plug 28, a sealing nut 29, leads 30, 30A, a high temperature-coefficient resistance element 31, and a thermal chamber 32. The fluid enters the chamber 32 through the flow path opening 25 affecting the element 31 as hereinafter described. The fluid leaves the thermal unit 27 by an opening in the chamber wall opposite the one by which it entered. This is a continuation of the flow path 25.

The path of flow next passes a needle valve assembly 33 placed to constrictably regulate said flow. The valve assembly 33 is shown in Figure 5 in which can be seen the flow path opening 25, the valve needle 34, the valve seat 35, and the sealing plug and its gasket 36.

By referring to Figure 2 it may be seen that the fluid in the flow path 25 is led into another thermal cell unit 37 identical in construction to the first thermal cell unit 27. As shown in Figure 1 the fluid upon leaving the thermal cell 37 is directed, by a 90° turn in the path 25, into a second metering needle valve assembly 38. Said valve 38 is a duplicate of the first metering needle valve 18. In the valve chamber 39 the fluid mixes with that portion of the flow which came through the other flow path 26. It then proceeds through the bore 40 of the valve nipple 41 and joins the fluid which has passed through the tube 10, as previously described. The tube 10 empties into the line into which the flowmeter is inserted.

By tracing the fluid through the second flow path 26 which leaves the metering needle valve assembly 18, it can be seen, by referring to Figure 1, that it too passes a thermal cell unit 42, a needle valve assembly 43 (identical in structure to the opposite needle valve 33), a second thermal cell unit 44, and then enters the metering needle valve assembly 38. The construction of the two thermal cell units 42, 44 is the same as that of the other thermal units 27, 37.

Four plug screws 45 are inserted in threaded bores 46 in the valve block 14. Said bores 46 connect with the flow paths 25, 26 and provide a means of cleaning them without removing the flowmeter from the line. Gaskets 47 are slipped over the plug screws 45 before insertion into the block 14 to prevent fluid leakage.

A thermal Wheatstone bridge system 48 completes the construction of this flowmeter. Figure 6 illustrates the manner in which the four thermal cell units 27, 37, 42 and 44 are connected into the well known Wheatstone bridge circuit. Said circuit comprises the current source 49, an adjustable resistance 50, the elements of the four thermal cell units 27, 37, 42 and 44, two compensating resistors 51, 52, the balancing resistor 53, a temperature compensating resistor 54 and an indicating meter 55.

In the actual operation of the flowmeter, the two thermal cells 42, 44 on one side of the valve block 14 are used as comparison cells in that a fixed and continuous amount of flow with respect to the total flow is directed through them. This is regulated by the two needle valves 33, 43 and constitutes a small ratio of the flow in the other two thermal cells 27, 37, which are the velocity indicating units. Any variation in the flow through the flowmeter produces a change in the velocity of fluid in the cells affecting the temperature of the electrically heated elements 31 therein.

Said elements are constructed of a substance having a high temperature coefficient of resistivity, with the result that any small variation in the temperature of any element 31 produces a measurable alteration of its resistance. This change in resistance unbalances the Wheatstone bridge 48 to an extent which is in direct proportion to the amount of flow in the flowmeter.

An advantage of this flowmeter is that it is capable of adjustment to give the desired calibration for any condition of operation. This is accomplished by the setting of the metering needle valves 18 and 38 to give the desired scale range of indication and the subsequent adjustment of needle valves 33, 43, to regulate sensitivity of the meter. The actual calibration of this flowmeter is a matter of easy adjustment depending upon the particular fluid being used.

The cooling of the filaments of the thermal cells occurs through a thermodynamic process referred to as "forced convection." The predominant variables which are manifest in this form of convective heat loss are the density of the fluid, its viscosity, specific heat at constant pressure, temperature difference between cell filament and ambient or block temperature and the velocity of flow. It can be seen through use of standard design methods and the calibration of the flowmeter device for a particular fluid that the heat loss becomes directly porportional to the velocity of flow of fluid since the other variables revert to a general constant which may be referred to as the "cell constant" for the flowmeter. This cell constant may be evaluated by simple experimental means for specific applications as desired so that the device may be accommodated for indication of any particular type of fluid, gaseous or liquid.

The indicating meter 55 is calibrated for any predetermined condition of operation by having the elements of the thermal cells 27, 37, 42 and 44 electrically heated to an even, constant temperature. With a very small flow of fluid through the flowmeter, and all valves fully open, the bridge circuit 48 is then adjusted to a zero reading on the indicating meter 55 by means of the zero adjustment control 33. The fluid through the flow path 26 is thereupon stopped by shutting valve 43. For a meter having a full scale indication of 100 units, the flow is now increased to a rate of exactly 100 units.

Metering needle valves 18 and 38 are then adjusted to give the indicating meter 55 a reading of 100 plus some chosen value of from 0.001 to 0.1 of a unit. The closed valve 43 governing the flow through the flow path 26 and around the comparison cells 42 and 44 is then opened sufficiently to give a meter 55 reading of exactly 100 units. This keeps the comparison cells 42, 44 fully charged at all times.

Two compensating resistors 51, 52 are shown in Figure 6. The function of these resistors is to compensate for the inclusion of the balancing resistor 53 in the bridge circuit 48.

It is within the purview of this invention to form the cell filaments of material having either a positive or negative temperature coefficient of resistance. Moreover, the filaments may be brought into direct contact with the fluid or be surrounded by a protective, thermally conducting shell to establish contact between the fluid and the element. In some instances, particaularly where the fluid to be measured is a combustible gas, it is desirable that this shell be partially non-conductive as a safety measure. The shell also serves to modify the thermal lag of the elements which results where minute and unimportant fluctuations occur in the fluid flow.

Having thus fully described the invention, what is claimed as new and desired to be secured by Letters Patent of the United States, is:

1. A thermal flowmeter comprising, a fluid receiving tube adapted to be coupled to a fluid supply line, a block member carried by the tube, said block being provided with a first bore communicating with the interior of the tube whereby fluid may pass from the tube into the block and a second bore provided in the block whereby fluid may leave the block and reenter the interior of the tube, said block being further provided with a first and second flow path both connected to the first and second bores, and enlarged wells along said first and second flow paths and communicating therewith so as to allow the fluid in the flow paths to pass through the said wells, valves carried within the block member adjacent the flow paths adapted to regulate the flow of fluid through the flow paths, said valves being adjustable so as to restrict and render the flow through the first flow path and the wells therein substantially constant so as to establish them as comparison wells while allowing the flow through the second path and the wells therein to vary directly with the fluctuation of the fluid in the supply line, and a thermal Wheatstone bridge circuit, a current indicating meter in the circuit, said bridge having an arm thereof in each of the wells in contact with the fluid therein, whereby the variation within the fluid flow which passes from the tube through the first bore, the second flow path, the wells connected to the second flow path and thence through the second bore before returning to the tube, will affect the conductivity of the arms in the wells so as to be translated into fluctuations of the current indicating meter.

2. A thermal flowmeter comprising, a fluid receiving tube adapted to be coupled to a fluid supply line, a block member carried by the tube, said block being provided with a first bore communicating with the interior of the tube whereby fluid may pass from the tube into the block and a second bore provided in the block whereby fluid may leave the block and reenter the interior of the tube, said block being further provided with a first and second flow path both connected to the first and second bores, and enlarged wells along said first and second flow paths and communicating therewith so as to allow the fluid in the flow paths to pass through the said wells, valves carried within the block member adjacent the flow paths adapted to regulate the flow of fluid through the flow paths, said valves being adjustable so as to restrict and render the flow through the first flow path and the wells therein substantially constant so as to establish them as comparison wells while allowing the flow through the second path and the wells therein to vary directly with the fluctuation of the fluid in the supply line, and a thermal Wheatstone bridge circuit comprising, a plurality of resistors, a source of electrical potential connected to the resistors for uniformly heating the resistors, a current indicating meter in the circuit, said bridge having an arm thereof in each of the wells in contact with the fluid therein, whereby the variation within the fluid flow which passes from the tube through the first bore, the second flow path, the wells connected to the second flow path and thence through the second bore before returning to the tube, will affect the conductivity of the arms in the wells so as to be translated into fluctuations of the current indicating meter.

3. A thermal flowmeter comprising, a fluid receiving tube adapted to be coupled to a fluid supply line, a block member carried by the tube, said block being provided with a first bore communicating with the interior of the tube whereby fluid may pass from the tube into the block and a second bore provided in the block whereby fluid may leave the block and reenter the interior of the tube, said block being further provided with a first and second flow path both connected to the first and second bores, and enlarged wells along said first and second flow paths and communicating therewith so as to allow the fluid in the flow paths to pass through the said wells, valves carried within the block member adjacent the flow paths adapted to regulate the flow of fluid through the flow paths, said valves being adjustable so as to restrict and render the flow through the first flow path and the wells therein substantially constant so as to establish them as comparison wells while allowing the flow through the second path and the wells therein to vary directly with the fluctuation of the fluid in the supply line, and a thermal Wheatstone bridge circuit comprising, a plurality of resistors, a source of electrical potential connected to the resistors, for uniformly heating the resistors, a thermally conducting shell surrounding each of the resistors, a current indicating meter in the circuit, said bridge having an arm thereof in each of the wells in contact with the fluid therein, whereby the variation within the fluid flow which passes from the tube through the first bore, the second flow path, the wells connected to the second flow path and thence through the second bore before returning to the tube, will affect the conductivity of the arms in the wells so as to be translated into fluctuations of the current indicating meter.

MICHAEL A. PICCIANO.

REFERENCES CITED

The following references are of record in the file of this patent:

UNITED STATES PATENTS

| Number | Name | Date |
| --- | --- | --- |
| 1,254,871 | Wilson | Jan. 29, 1918 |
| 1,416,572 | Packard | May 16, 1922 |
| 1,818,619 | Harrison | Aug. 11, 1931 |
| 2,067,645 | Pinkerton | Jan. 12, 1937 |
| 2,319,516 | Phelps | May 18, 1943 |